US006848428B2

(12) United States Patent
Watanabe et al.

(10) Patent No.: US 6,848,428 B2
(45) Date of Patent: Feb. 1, 2005

(54) FUEL INJECTION CONTROL SYSTEM FOR INTERNAL COMBUSTION ENGINE

(75) Inventors: Tsuguo Watanabe, Saitama (JP); Tatsuo Hayashi, Saitama (JP); Kenichi Machida, Saitama (JP); Tomomi Yuhara, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/646,740

(22) Filed: Aug. 25, 2003

(65) Prior Publication Data

US 2004/0069283 A1 Apr. 15, 2004

(30) Foreign Application Priority Data

Sep. 11, 2002 (JP) ........................................ 2002-265660

(51) Int. Cl.[7] .......................... F02D 41/10; F02M 69/00
(52) U.S. Cl. ...................................... 123/492; 123/478
(58) Field of Search ................................ 123/478, 480, 123/492

(56) References Cited

U.S. PATENT DOCUMENTS

| | | | | |
|---|---|---|---|---|
| 4,315,491 A | * | 2/1982 | Takeda ........................ 123/478 |
| 4,612,904 A | * | 9/1986 | Tadokoro et al. ........... 123/492 |
| 4,819,604 A | * | 4/1989 | Koike et al. ................. 123/492 |
| 4,825,834 A | * | 5/1989 | Toshimitsu et al. ......... 123/492 |
| 4,883,039 A | * | 11/1989 | Toshimitsu et al. ......... 123/492 |
| 4,895,122 A | * | 1/1990 | Noguchi et al. ............. 123/680 |
| 5,284,117 A | * | 2/1994 | Akase .......................... 123/478 |
| 5,413,078 A | * | 5/1995 | Mitsunaga et al. .......... 123/492 |
| 6,508,234 B2 | * | 1/2003 | Machida et al. ............. 123/478 |
| 6,640,785 B2 | * | 11/2003 | Almkvist ..................... 123/492 |

FOREIGN PATENT DOCUMENTS

| | | | |
|---|---|---|---|
| JP | 04183949 A | 6/1992 |
| JP | 10196440 A | 7/1998 |

* cited by examiner

*Primary Examiner*—Tony M. Argenbright
(74) *Attorney, Agent, or Firm*—Birch, Stewart, Kolasch & Birch, LLP

(57) ABSTRACT

In an internal combustion engine in which fuel injection valves are arranged upstream from and downstream from the throttle valve, respectively, the response of the accelerated increase in quantity and correction will be improved. The total injection quantity determination unit determines a total quantity of fuel to be injected from each fuel injection valve. The injection rate determination unit determines an injection rate of the upstream injection valve. The injection quantity correction unit includes an accelerated increase in quantity and correction unit, and during acceleration, increases and corrects only the injection quantity of the downstream injection valve during acceleration. The injection quantity determination unit determines the injection quantity of the upstream injection valve on the basis of the injection rate and the total injection quantity, and determines the injection quantity of the downstream injection valve on the basis of the upstream injection quantity and the total injection quantity.

10 Claims, 6 Drawing Sheets

|  | Cne00 | Cne01 | | | Cnei | | | | | Cne14 | | | | | |
|---|---|---|---|---|---|---|---|---|---|---|---|---|---|---|---|
| Cth0 | Rupper (0,0) | Rupper (1,0) | .. | .. | Rupper (i,0) | .. | .. | .. | .. | Rupper (14,0) | .. | .. | | | |
| Cth1 | .. | .. | | | | | | | | | | | | | |
| Cth2 | .. | .. | | | | | | | | | | | | | |
| .. | .. | .. | | | | | | | | | | | | | |
| Cthj | Rupper (0,j) | Rupper (1,j) | | | Rupper (i,j) | | | | | Rupper (14,j) | | | | | |
| .. | .. | .. | | | .. | | | | | .. | | | | | |
| Cth7 | .. | .. | | | .. | | | | | .. | | | | | |
| Cth8 | .. | .. | | | .. | | | | | .. | | | | | |
| Cth9 | Rupper (0,9) | Rupper (1,9) | | | Rupper (i,9) | | | | | Rupper (14,9) | | | | | |

FIG.3

|       | Cne00        | Cne01        | Cnei         | Cne14         |
|-------|--------------|--------------|--------------|---------------|
| Cpb0  | Qtotal (0,0) | Qtotal (1,0) | Qtotal (i,0) | Qtotal (14,0) |
| Cpb1  | :            | :            | :            | :             |
| Cpb2  | :            | :            | :            | :             |
| :     | :            | :            | :            | :             |
| Cpbj  | Qtotal (0,j) | Qtotal (1,j) | Qtotal (i,j) | Qtotal (14,j) |
| :     | :            | :            | :            | :             |
| Cpb7  | :            | :            | :            | :             |
| Cpb8  | :            | :            | :            | :             |
| Cpb9  | Qtotal (0,9) | Qtotal (1,9) | Qtotal (i,9) | Qtotal (14,9) |

FIG.5

|       | Cne00        | Cne01        | Cnei         | Cne14         |
|-------|--------------|--------------|--------------|---------------|
| Cth0  | Qtotal (0,0) | Qtotal (1,0) | Qtotal (i,0) | Qtotal (14,0) |
| Cth1  | :            | :            | :            | :             |
| Cth2  | :            | :            | :            | :             |
| :     | :            | :            | :            | :             |
| Cthj  | Qtotal (0,j) | Qtotal (1,j) | Qtotal (i,j) | Qtotal (14,j) |
| :     | :            | :            | :            | :             |
| Cth7  | :            | :            | :            | :             |
| Cth8  | :            | :            | :            | :             |
| Cth9  | Qtotal (0,9) | Qtotal (1,9) | Qtotal (i,9) | Qtotal (14,9) |

FIG.6

FUEL INJECTION CONTROL SYSTEM FOR INTERNAL COMBUSTION ENGINE

CROSS-REFERENCE TO RELATED APPLICATIONS

This nonprovisional application claims priority under 35 U.S.C. § 119(a) on patent application No. 2002-265660, filed in Japan on Sep. 11, 2002, the entirety of which is incorporated herein by reference.

BACKGROUND OF THE INVENTION

1. Field of the Invention

The present invention relates to a fuel injection control system for an internal combustion engine. More particularly, the present invention relates to a fuel injection control system in an internal combustion engine in which fuel injection valves have been arranged on the upstream and downstream sides of a throttle valve.

2. Description of Background Art

When a fuel injection valve is provided upstream from the throttle valve, the volumetric efficiency is improved because heat is taken from intake air when injection fuel vaporizes. Therefore, the engine output can be increased as compared with when the fuel injection valve is provided downstream from the throttle valve.

However, when the fuel injection valve is provided on the upstream side, a response lag occurs in fuel transport as compared with when the fuel injection valve is provided downstream from the throttle valve because a distance between the fuel injection port and a combustion chamber inevitably increases.

Japanese Patent Laid-Open Nos. 4-183949 and 10-196440 discloses a fuel injection system in which fuel injection valves have been provided in the intake pipe at locations upstream and downstream from the throttle valve in order to improve the engine output and cope with the response lag.

FIG. 7 is a cross-sectional view showing a major portion of an internal combustion engine according to the background art, in which two fuel injection valves have been arranged with the throttle valve 52 of the intake pipe 51 interposed therebetween. Specifically, a first fuel injection valve 50a has been arranged on the downstream side and a second fuel injection valve 50b has been arranged on the upstream side.

In an internal combustion engine equipped with such fuel injection valves, an accelerated increase in quantity and correction has been experienced, in which an accelerated driving state is detected to increase and correct an injection quantity of fuel. During such accelerated increase in quantity and correction, it is necessary to control an air-fuel ratio in such a manner that fuel does not lag behind an increase in intake air quantity during acceleration. Accordingly, it is requested to quickly increase the quantity of injection fuel. In view of this, in an internal combustion engine equipped with two fuel injection valves, if the fuel for an accelerated increase in quantity and correction is dispersed into both the upstream side and the downstream side, it will becomes difficult to obtain sufficient acceleration performance due to a response lag which occurs with the injection quantity on the upstream side.

SUMMARY OF THE INVENTION

It is an object of the present invention to solve the problem of the background art technique described above, and to provide a fuel injection control system, which is excellent in response to the accelerated increase in quantity and correction in an international combustion engine in which fuel injection valves are arranged upstream from and downstream from the throttle valve, respectively.

In order to achieve the above-described object, the present invention is directed to a fuel injection system for an internal combustion engine provided with an intake pipe equipped with a throttle valve, an upstream fuel injection valve provided upstream from the throttle valve, and a downstream fuel injection valve provided downstream from the throttle valve. Means are provided for controlling a fuel injection quantity of each of the fuel injection valves on the basis of plural parameters including a throttle opening and the engine speed, and means is provided for detecting an accelerated driving state to increase and correct the quantity of injection fuel. The above-described accelerated increase in quantity and correction increases the injection quantity of the downstream fuel injection valve.

According to the above-described feature, fuel is all injected from the downstream fuel injection valve, the quantity of which has been increased by the accelerated increase in quantity and correction. Accordingly, no response lag is caused in injection of the fuel for the accelerated increase in quantity and correction. Therefore, it is possible to improve the response to the accelerated increase in quantity and correction.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is a view showing one example of an injection rate table;

FIG. 5 is a view showing one example of a PB map;

FIG. 6 is a view showing one example of a TH map; and

DETAILED DESCRIPTION OF THE PREFERRED EMBODIMENTS

Figure 1:
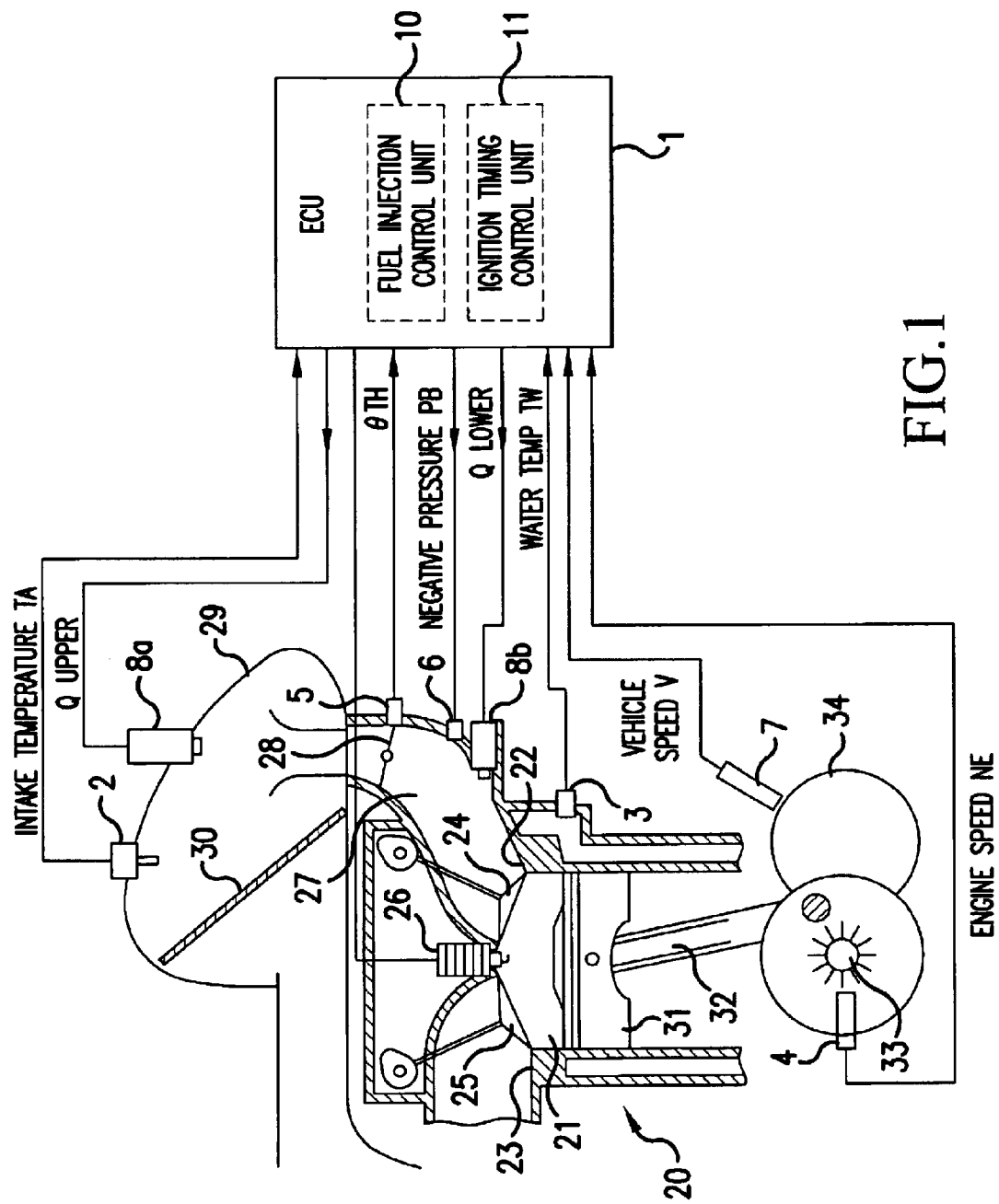
FIG. 1 is a general block diagram showing a fuel injection system according to one embodiment of the present invention.

A preferred embodiment of the present invention will now be described with reference to the accompanying drawings. FIG. 1 is a general block diagram showing a fuel injection system according to one embodiment of the present invention. An intake port 22 and an exhaust port 23 open into a combustion chamber 21 of the engine 20. Each port 22 and 23 is provided with an intake valve 24 and an exhaust valve 25, respectively. An ignition plug 26 is provided extending into the combustion chamber 21.

A throttle valve 28 for adjusting intake air quantity in accordance with its opening θTH, a throttle sensor 5 for detecting the opening θTH and a vacuum sensor 6 for detecting intake manifold vacuum PB are provided on an intake passage 27 leading to the intake port 22. An air cleaner 29 is provided at a terminal of the intake passage 27. Within the air cleaner 29, an air filter 30 is provided. Outside air is taken into the intake passage 27 through the air filter 30.

A downstream injection valve 8b is arranged downstream from the throttle valve 28 in the intake passage 27. An upstream injection valve 8a is arranged on the air cleaner 29 upstream from the throttle valve 28, so as to point toward the intake passage 27. An intake temperature sensor 2 is provided for detecting intake (atmospheric) temperature TA.

An engine speed sensor 4 for detecting engine speed NE on the basis of a rotation angle of a crank is arranged opposite to a crankshaft 33, which is coupled to a piston 31 of the engine 20 through a connecting rod 32. Furthermore, a vehicle speed sensor 7 for detecting vehicle speed V is arranged opposite to a rotor 34, such as a gear, which is coupled to the crankshaft 33 for rotation. A water temperature sensor 3 for detecting cooling water temperature TW representing the engine temperature is provided on a water jacket formed around the engine 20.

An ECU (Engine Control Unit) 1 includes a fuel injection control unit 10 and an ignition timing control unit 11. The fuel injection control unit 10 outputs, on the basis of signals (process values) obtained by each of the above-described sensors, injection signals Qupper and Qlower to each injection valve 8a, 8b on the upstream and downstream sides. Each of the injection signals is a pulse signal having a pulse width responsive to the injection quantity. Each injection valve 8a, 8b is opened by a time corresponding to the pulse width to inject fuel. The ignition timing control unit 11 controls the ignition timing of the ignition plug 26.

Figure 2:
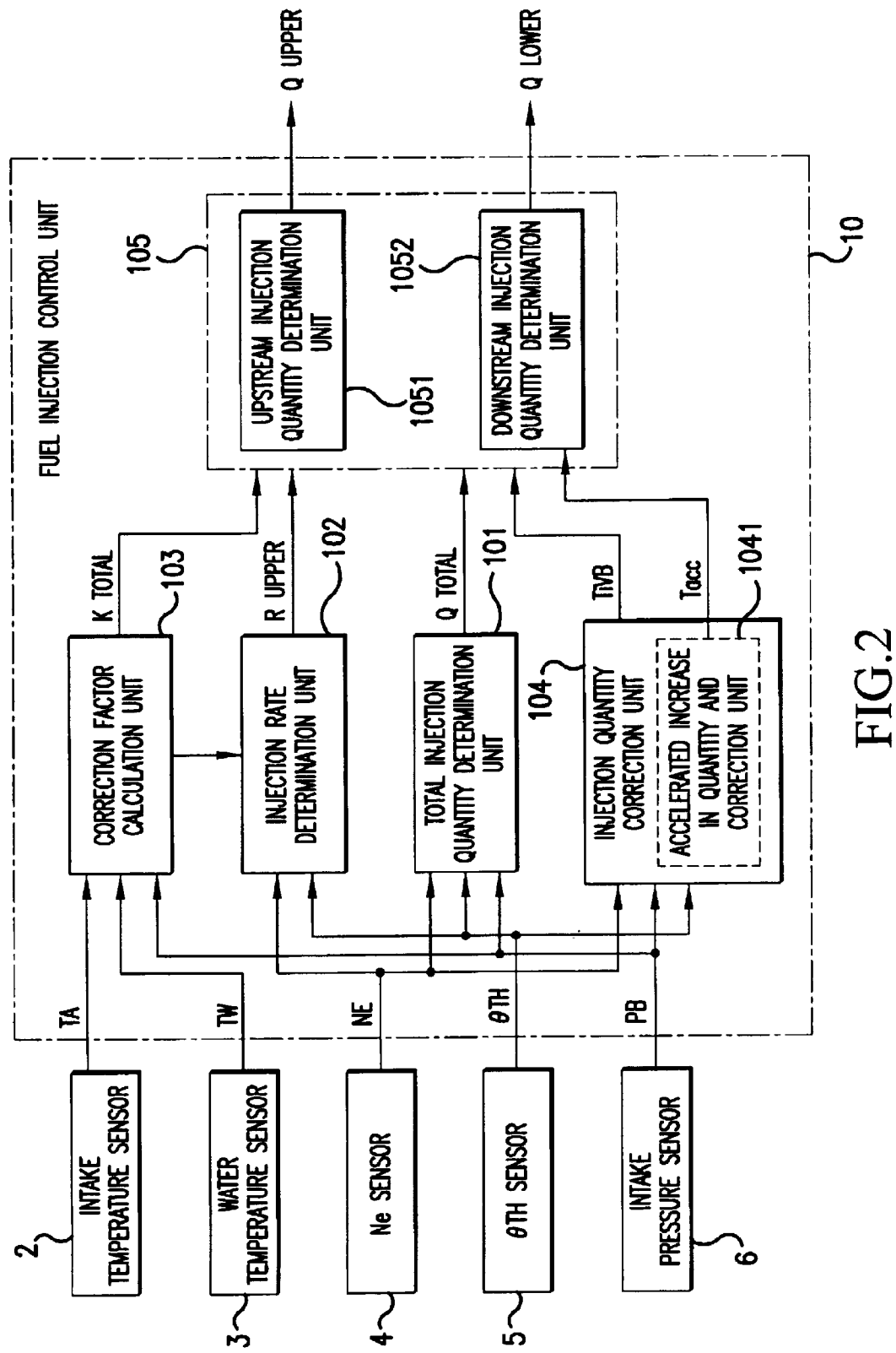
FIG. 2 is a functional block diagram for a fuel injection control unit 10.

FIG. 2 is a functional block diagram for the fuel injection control unit 10. It should be noted that the same reference numerals have been used to identify the same or similar elements throughout the several views.

A total injection quantity determination unit 101 determines a total quantity Qtotal of fuel to be injected from each fuel injection valve 8a, 8b on the upstream and downstream sides on the basis of the engine speed NE, the throttle opening θTH and the intake pressure PB. An injection rate determination unit 102 refers to an injection rate table on the basis of the engine speed NE and the throttle opening θTH to determine an injection rate Rupper of the upstream injection valve 8a. An injection rate Rlower of the downstream injection valve 8b is determined as (1−Rupper).

FIG. 3 is a view showing an example of the injection rate table. In the present embodiment, an injection rate map includes 15 items (Cne00 to Cne14) as a reference for the engine speed NE, and 10 items (Cth0 to Cth9) as a reference for the throttle opening θTH. The injection rate Rupper of the upstream injection valve 8a is registered in advance at each combination of each engine speed NE and throttle opening θTH. The injection rate determination unit 102 determines an injection rate Rupper corresponding to the engine speed NE and the throttle opening θTH that have been detected, by means of four-point interpolation on the injection rate map.

Referring again to FIG. 2, a correction factor calculation unit 103 calculates a manifold air pressure correction factor Kpb, an intake temperature correction factor Kta and a cooling water temperature correction factor Ktw and the like on the basis of process values such as the manifold air pressure PB, the intake temperature TA and the cooling water temperature TW. The correction factor calculation unit 103 further calculates a total correction factor Ktotal by integrating all of the above correction factors.

An injection quantity correction unit 104 includes an accelerated increase in quantity and correction unit 1041. During acceleration, the injection quantity correction unit 104 increases and corrects the injection quantity of the downstream injection valve 8b for acceleration. In an injection quantity determination unit 105, an upstream injection quantity determination unit 1051 determines an injection quantity Qupper of the upstream injection valve 8a on the basis of the injection rate Rupper and the total injection quantity Qtotal. A downstream injection quantity determination unit 1052 determines the injection quantity Qlower of the downstream injection valve 8b on the basis of the upstream injection quantity Qupper and the total injection quantity Qtotal.

Figure 4:
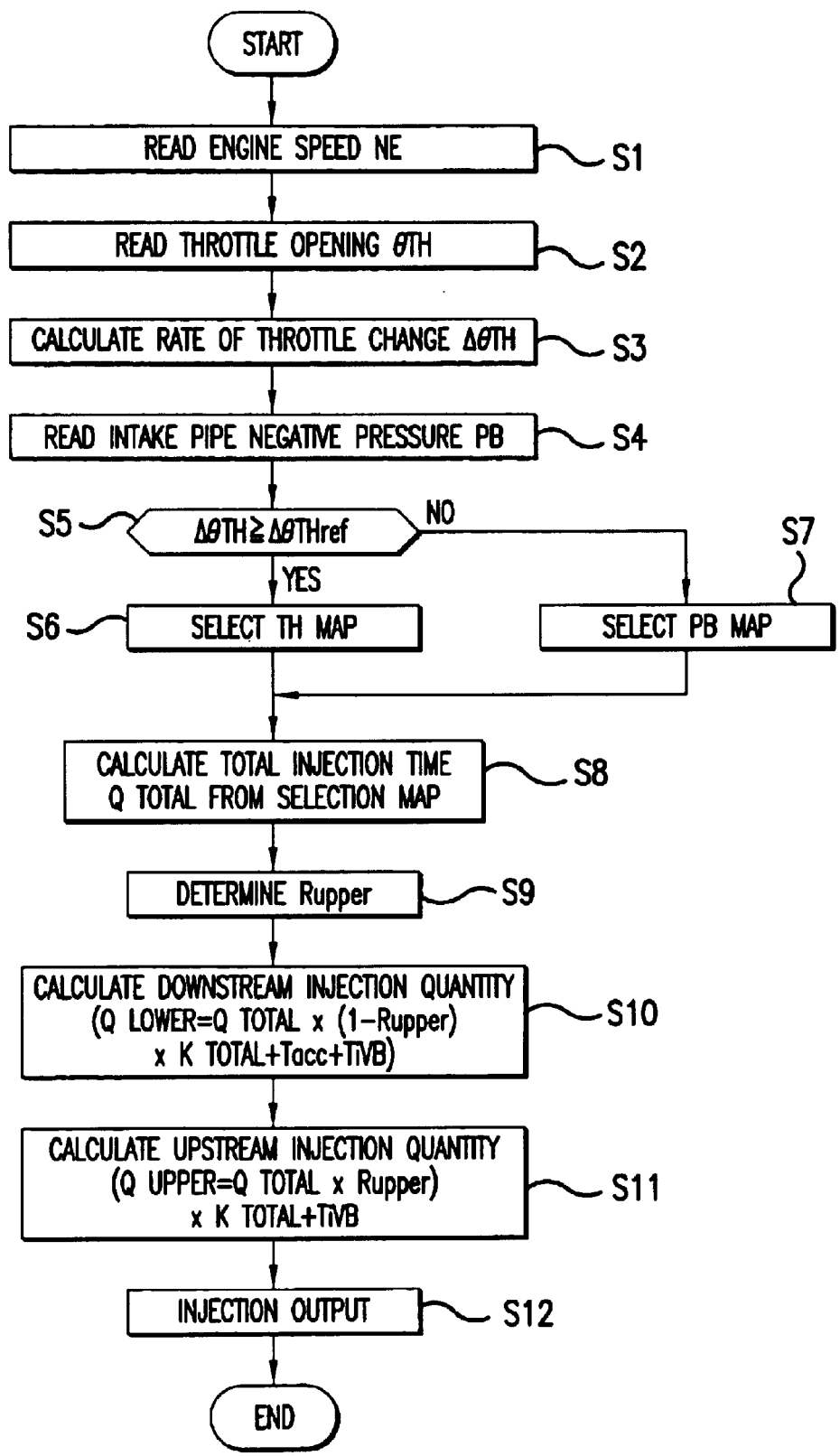
FIG. 4 is a flowchart showing a control procedure of fuel injection.
Figure 7:
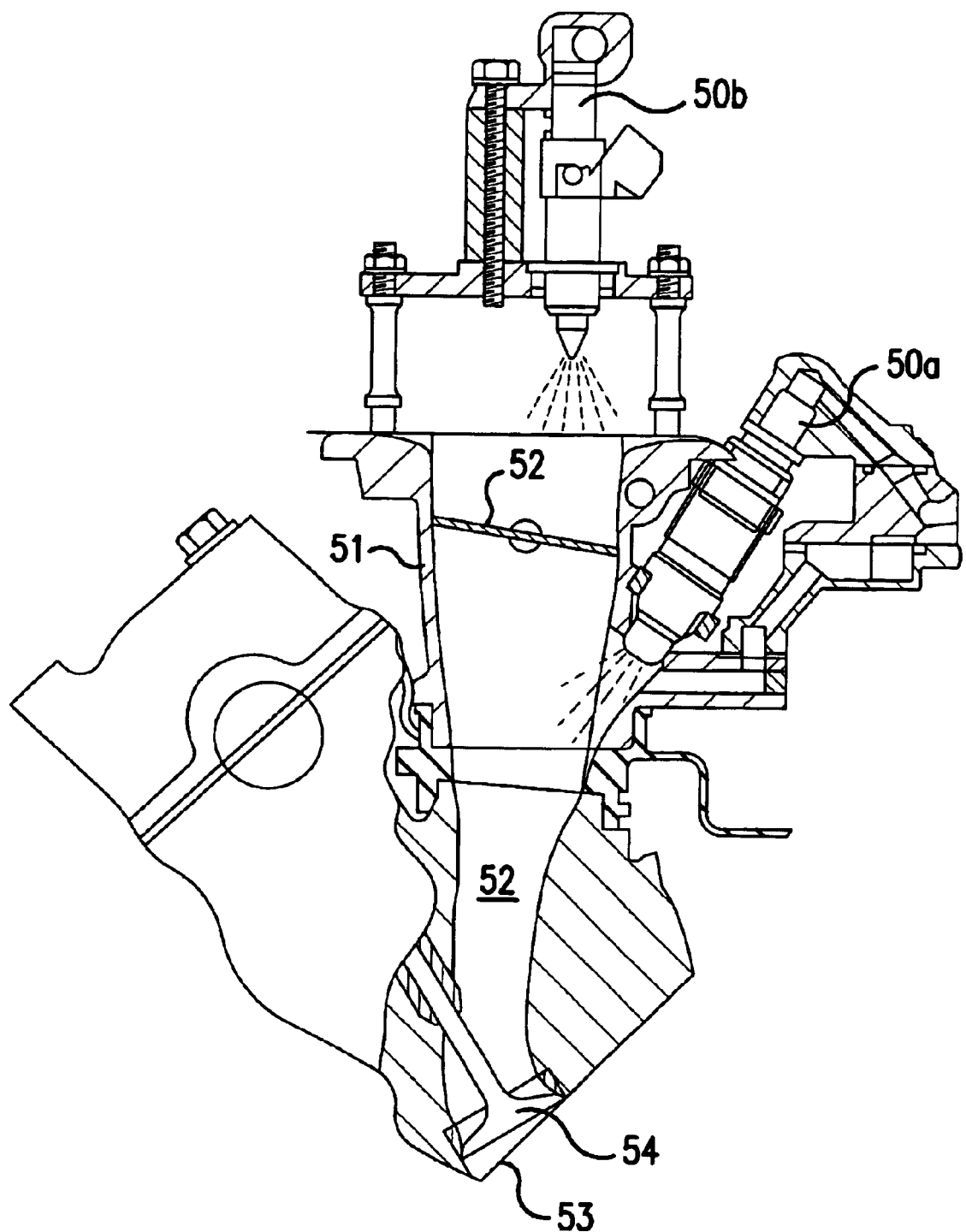
FIG. 7 is a cross-sectional view showing an internal combustion engine according to the background art, in which two fuel injection valves have been arranged.

Referring to the flowchart of FIG. 4, a description will be made of the operation of the fuel injection control unit 10 in detail. This handling is executed by interruption due to a crank pulse in a predetermined stage.

In a step S1, the engine speed NE is read. In a step S2, the throttle opening θTH is read. In a step S3, an hour rate of change ΔθTH of the throttle opening θTH is calculated on the basis of a differential between a previous value for the throttle opening θTH obtained by the detecting in the step S2 and this value. In a step S4, the manifold air pressure PB is read. In a step S5, the hour rate of change ΔθTH of the throttle opening θTH is compared with a reference rate of change ΔθTHref.

If the rate of change ΔθTH is below the reference rate of change ΔθTHref, the sequence will proceed to a step S7 because it is determined that the throttle handling is slow and the engine is in a steady state. In the step S7, the PB map is selected by the total injection quantity determination unit 101.

FIG. 5 is a view showing an example of the PB map. In the present embodiment, 15 items (Cne00 to Cne14) are defined as the engine speed NE, and 10 items (Cpb0 to Cpb9) are defined as the manifold air pressure PB. The total injection quantity Qtotal is registered in advance at each combination of each engine speed NE and manifold air pressure PB.

In contrast to this, if the rate of change ΔθTH exceeds the reference rate of change ΔθTHref, the sequence will proceed to a step S6 because the engine is determined to be in a transient state. In the step S6, the TH map is selected by the total injection quantity determination unit 101.

FIG. 6 is a view showing an example of the TH map. In the present embodiment, 15 items (Cne00 to Cne14) are defined as the engine speed NE, and 10 items (Cth0 to Cth9) are defined as the throttle opening θTH. The total injection quantity Qtotal is registered in advance at each combination of each engine speed NE and throttle opening θTH.

In a step S8, the PB map 106 is retrieved on the basis of the engine speed NE and the manifold air pressure PB in response to the map selected, or the TH map 107 is retrieved on the basis of the engine speed NE and the throttle opening θTH to calculate the total injection quantity Qtotal. The total injection quantity determination unit 101 determines an injection rate Rupper responsive to the engine speed NE and the throttle opening θTH (or manifold air pressure PB) detected by means of four-point interpolation on each of the maps.

In a step S9, in the injection rate determination unit 102, the injection rate table is referred to on the basis of the engine speed NE and the throttle opening θTH to determine the injection rate Rupper of the upstream injection valve 8a.

In a step S10, the injection quantity Qlower of the downstream injection valve is calculated by adding, to a product of the total injection quantity Qtotal, the downstream injection rate (1−Rupper) and a total correction factor Ktotal obtained by the correction factor calculation unit 103, a predetermined accelerated increase quantity value Tacc further obtained by calculating by the accelerated increase in quantity and correction unit 1041 and an invalid injection time TiVB. The acceleration corrected quantity Tacc is calculated as a function of, for example, the rate of change of the throttle opening θTH and the manifold air pressure PB. The invalid injection time TiVB is a time during which perfect injection of fuel is not accomplished. The invalid injection time TiVB is determined by the type and structure of the fuel injection valve.

In a step S11, the injection quantity Qupper of the upstream injection valve is calculated by adding a further invalid injection time TiVB to a product of the total injection quantity Qtotal, the upstream injection rate Rupper and a total correction factor Ktotal obtained by the correction factor calculation unit 103. In a step S12, a driving signal responsive to the upstream injection quantity Qupper and the downstream injection quantity Qlower is supplied to the upstream fuel injection valve 8a and the downstream fuel injection valve 8b. Each fuel injection valve 8a, 8b is opened by a time corresponding to the upper injection quantity Qupper and the downstream injection quantity Qlower to inject the fuel.

According to the present invention, all of the fuel is injected from the downstream fuel injection valve, since the quantity of fuel has been increased by the accelerated increase in quantity and correction. Accordingly, no response lag occurs in the injection of the fuel during the accelerated increase in quantity and correction. Accordingly, the response in the accelerated increase in quantity and correction can be improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fuel injection control system for an internal combustion engine, the internal combustion engine including an intake pipe equipped with a throttle valve, an upstream fuel injection valve provided upstream from the throttle valve, and a downstream fuel injection valve provided downstream from the throttle valve, said fuel injection control system comprising:

means for controlling a fuel injection quantity of each of the fuel injection valves on the basis of plural parameters including a throttle opening and engine speed; and means for detecting an accelerated driving state to increase and correct the quantity of injection fuel, wherein said increase in quantity and correction increases the injection quantity of said downstream fuel injection valve, wherein said means for controlling the fuel injection quantity of each of the fuel injection valves further comprises means for determining a total injection quantity of the fuel injection valves and means for determining an injection rate of each of the fuel injection valves on the basis of the throttle opening and the engine speed, and wherein said means for controlling the fuel injection quantity of each of the fuel injection valves further comprises means for calculating a total correction factor on the basis of plural parameters including manifold air pressure intake temperature and cooling water temperature.

2. The fuel injection control system for an internal combustion engine according to claim 1, wherein said means for calculating a total correction factor calculates a manifold pressure correction factor, an intake temperature correction factor and a cooling water temperature correction factor on the basis of the manifold air pressure, the intake temperature and the cooling water temperature, respectively, said total correction factor being calculated by integrating the manifold correction factor, the intake temperature correction factor and a cooling water temperature correction factor.

3. The fuel injection control system for an internal combustion engine according to claim 1, wherein said means for controlling the fuel injection quantity of each of the fuel injection valves further comprises means for determining an injection quantity of the fuel injection valves, said means for determining the quantity of the fuel injection valves including means for determining an injection quantity of the upstream fuel injection valve and means for determining an injection quantity of the downstream fuel injection valve.

4. A method of fuel injection for an internal combustion engine, the internal combustion engine including an intake pipe equipped with a throttle valve, an upstream fuel injection valve provided upstream from the throttle valve, and a downstream fuel injection valve provided downstream from the throttle valve, said method comprising the steps of:

controlling a fuel injection quantity of each of the fuel injection valves on the basis of plural parameters including a throttle opening and engine speed; and detecting an accelerated driving state to increase and correct the quantity of injection fuel, wherein said increase in quantity and correction increases the injection quantity of said downstream fuel injection valve, wherein said step of controlling the fuel injection quantity of each of the fuel injection valves further comprises the steps of determining a total injection quantity of the fuel injection valves and determining an injection rate of each of the fuel injection valves on the basis of the throttle opening and the engine speed, and wherein said step of controlling the fuel injection quantity of each of the fuel injection valves further comprises the step of calculating a total correction factor Ktotal on the basis of plural parameters including manifold air pressure, intake temperature and cooling water temperature.

5. The method according to claim 4, wherein said step of calculating a total correction factor calculates a manifold pressure correction factor, an intake temperature correction factor and a cooling water temperature correction factor on the basis of the manifold air pressure, the intake temperature and the cooling water temperature, respectively, said total correction factor being calculated by integrating the manifold correction factor, the intake temperature correction factor and a cooling water temperature correction factor.

6. The method according to claim 4, wherein said step of controlling the fuel injection quantity of each of the fuel injection valves further comprises the step of determining an injection quantity of the fuel injection valves, said step of determining the quantity of the fuel injection valves including the steps of determining an injection quantity of the upstream fuel injection valve and determining an injection quantity of the downstream fuel injection valve.

7. A fuel injection control system for an internal combustion engine, the internal combustion engine including an intake pipe equipped with a throttle valve, an upstream fuel injection valve provided upstream from the throttle valve, and a downstream fuel injection valve provided downstream from the throttle valve, said fuel injection control system comprising:

- a total injection quantity determination unit for determining a total injection quantity of fuel to be injected from each of the fuel injection valves;
- an injection rate determination unit for determining an injection rate of each of the fuel injection valves;
- an injection quantity correction unit for increasing and correcting the injection quantity of the downstream fuel injection valve during acceleration of the engine; and
- a correction factor calculation unit for calculating a total correction factor on the basis of plural parameters including manifold air pressure intake temperature and cooling water temperature.

8. The fuel injection control system for an internal combustion engine according to claim 7, wherein said correction factor calculation unit calculates a manifold pressure correction factor, an intake temperature correction factor and a cooling water temperature correction factor on the basis of the manifold air pressure, the intake temperature and the cooling water temperature, respectively, said total correction factor being calculated by integrating the manifold correction factor, the intake temperature correction factor and a cooling water temperature correction factor.

9. The fuel injection control system for an internal combustion engine according to claim 7, further comprises an injection quantity determination unit including a downstream injection quantity determination unit and an upstream injection quantity determination unit.

10. The fuel injection control system for an internal combustion engine according to claim 9, wherein said upstream injection quantity determination unit determines an injection quantity of the upstream injection valve on the basis of the injection rate of the upstream fuel injection valve and the total injection quantity, and said downstream injection quantity determination unit determines an injection quantity of the downstream fuel injection valve on the basis of the upstream injection quantity and the and the total injection quantity.

* * * * *